Sept. 16, 1969     P. VAN DONKELAAR     3,466,858
LAWN MOWER
Filed Oct. 15, 1965                              4 Sheets-Sheet 1
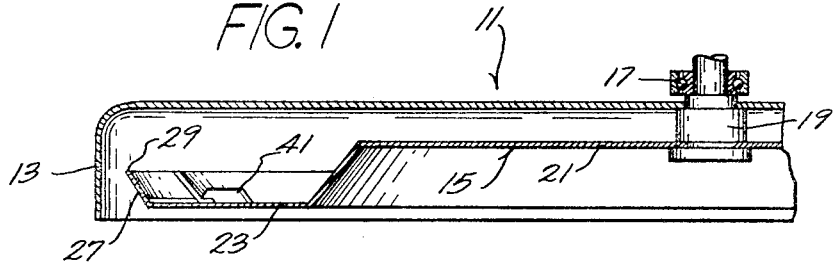
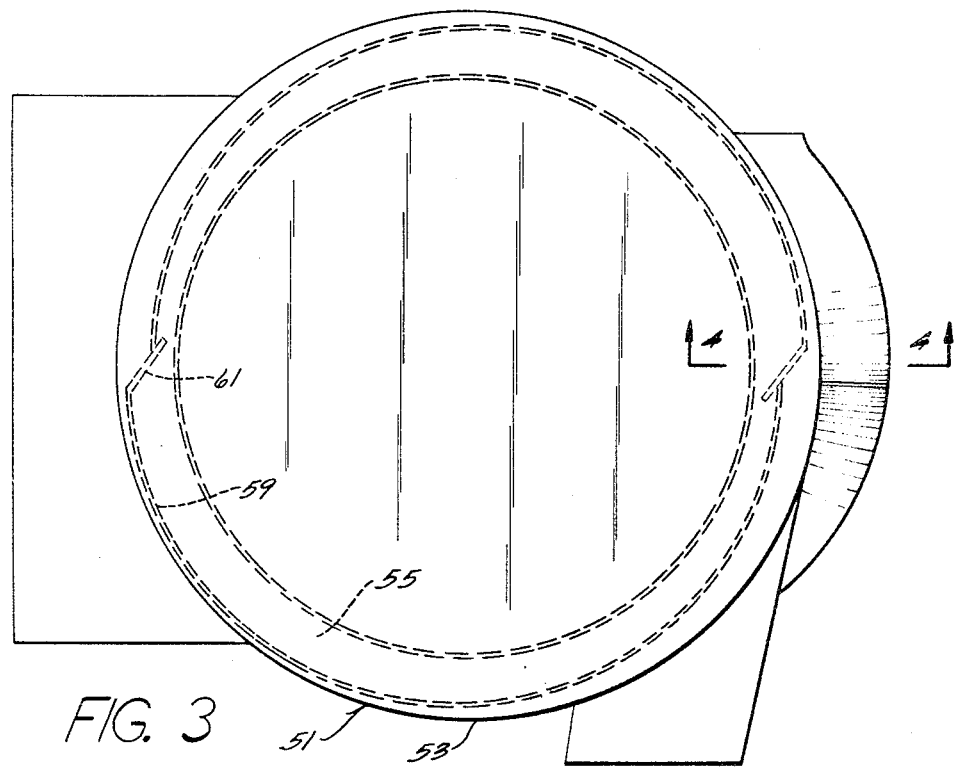
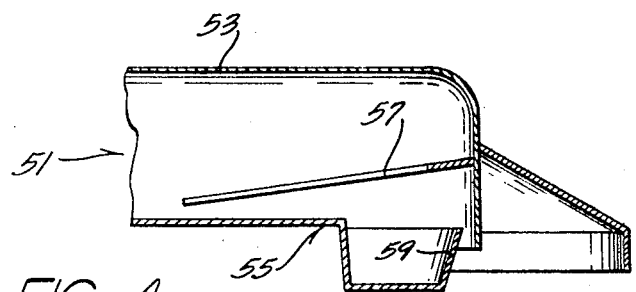
INVENTOR
PIETER VAN DONKELAAR
BY Wheeler, Wheeler & Wheeler
ATTORNEYS

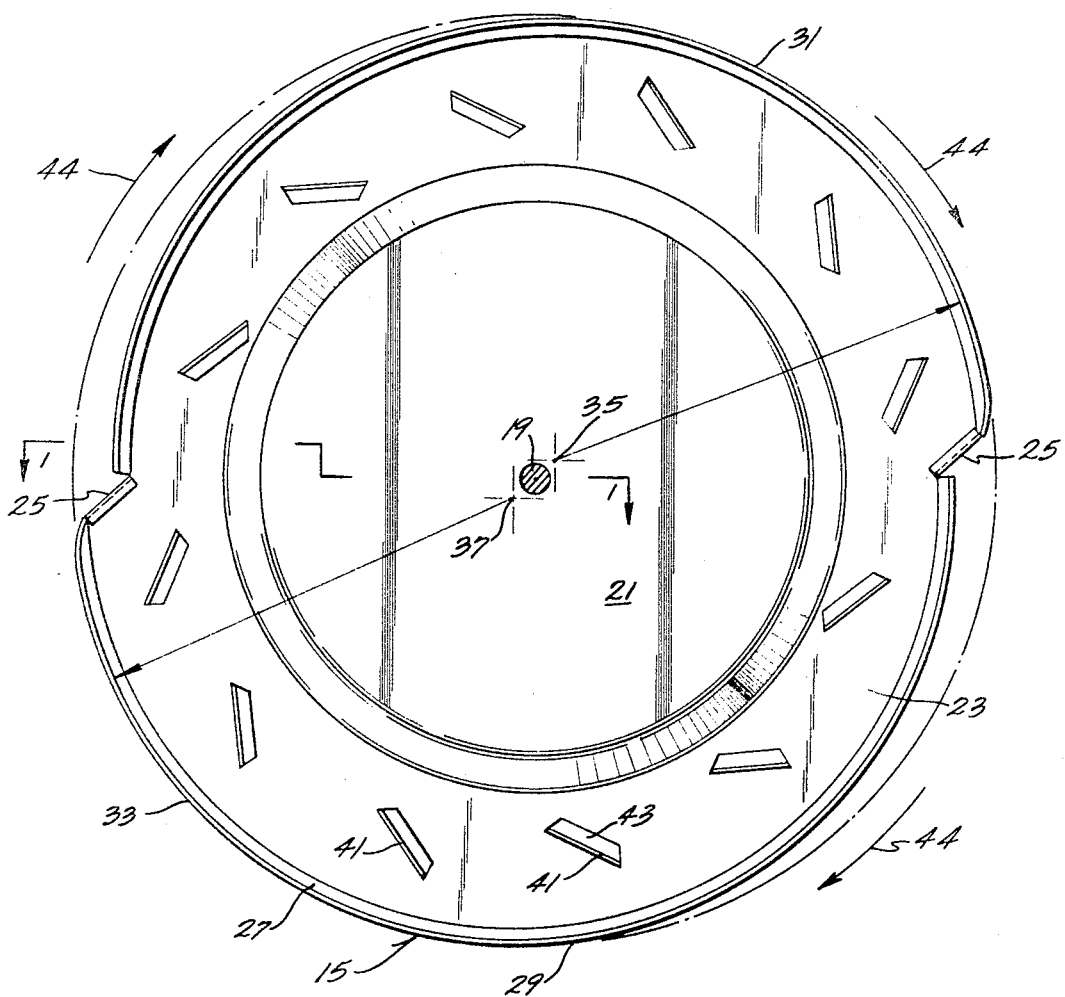

Sept. 16, 1969 P. VAN DONKELAAR 3,466,858
LAWN MOWER
Filed Oct. 15, 1965 4 Sheets-Sheet 3

INVENTOR
PIETER VAN DONKELAAR

BY Wheeler, Wheeler & Wheeler
ATTORNEYS

United States Patent Office 3,466,858
Patented Sept. 16, 1969

3,466,858
LAWN MOWER
Pieter van Donkelaar, Aardenburg, Netherlands, assignor to Outboard Marine Corporation, Waukegan, Ill., a corporation of Delaware
Filed Oct. 15, 1965, Ser. No. 496,484
Claims priority, application Belgium, Mar. 26, 1965, 10,794; Norway, Sept. 29, 1965, 159,898
Int. Cl. A01d 55/18
U.S. Cl. 56—295       18 Claims

ABSTRACT OF THE DISCLOSURE

Disclosed herein is a rotary lawn mower having a cutter with a segment supporting a cutting edge and having an arcuate peripheral margin extending in the direction of intended rotary movement from adjacent to said cutting edge and increasing in radial distance to a point of maximum radial distance which is greater than the outermost radial end of said cutting edge. Said edge then decreases in radial distance in the direction of intended movement toward the cutting edge.

---

The invention relates to rotary mowing machines. More particularly, the invention relates to rotary mowers, such as lawn mowers, and to rotary blades or cutters therefor.

One of the principal objects of the invention is to provide a cutter adapted to be rotatably mounted in the housing of a rotary mower and including a segment which extends from the rotatable mounting and which has a radially extending cutting edge at the end of an arcuate peripheral rim, margin, or edge which increases in radial distance from the rotary mounting in the direction of intended cutter rotation. The radial extent of the cutting edge is limited so as not to exceed the maximum distance of the segment rim, margin or edge from the rotary mounting. As a result, any tendency of the cutter to impel a stone or other similar object is substantially reduced, if not entirely eliminated, thereby affording substantially increased safety. In addition, the portion of the segment margin at the maximum radial distance from the rotary mounting serves to substantially reduce the possibility of the operator cutting his hand or foot by substantially preventing hand or foot movement into the path of the cutting edge.

In one form of the invention, the cutting edge is provided by a razor blade or the like which is removably connected to the cutter segment. The use of a sharp edge, such as is provided on a razor blade, provides for clean cutting of the grass and avoids the tearing action which often occurred during operation of previous rotary mowers. In addition, the use of a sharp edge, such as that provided by a razor blade, permits cutting at a lesser rate of speed and with a lesser power requirement.

Maintenance of the sharpness of the cutting edge is facilitated by reason of the portion of the segment margin which is located at maximum radial distance from the rotary mounting and which serves to prevent engagement of the cutting edge with rocks, stones, or other like material which could damage or excessively dull the cutting edge.

Another object of the invention is to provide a rotary cutter which includes a portion on the segment periphery for radially outwardly camming articles which might damage the cutting edge or which, in previous constructions, might have been thrown from the mower at a high velocity as a result of being struck by the cutting edge or blade.

Another object of the invention is to provide a rotary cutter which is economical to construct and which incorporates the safety features mentioned above. Other objects and advantages of the invention will become known by reference to the following description and the accompanying drawings of various embodiments of the invention.

In the drawings:

FIGURE 1 is a fragmentary view, in section, of a first embodiment of a mowing or cutting device incorporating various of the features of the invention, the view being taken generally along line 1—1 of FIGURE 2;

FIGURE 2 is a plan view of the cutter incorporated in the cutting device shown in FIGURE 1;

FIGURE 3 is a plan view of a second embodiment of a mowing device embodying various of the features of the invention;

FIGURE 4 is an enlarged fragmentary sectional view taken along line 4—4 of FIGURE 3;

Figure 5:
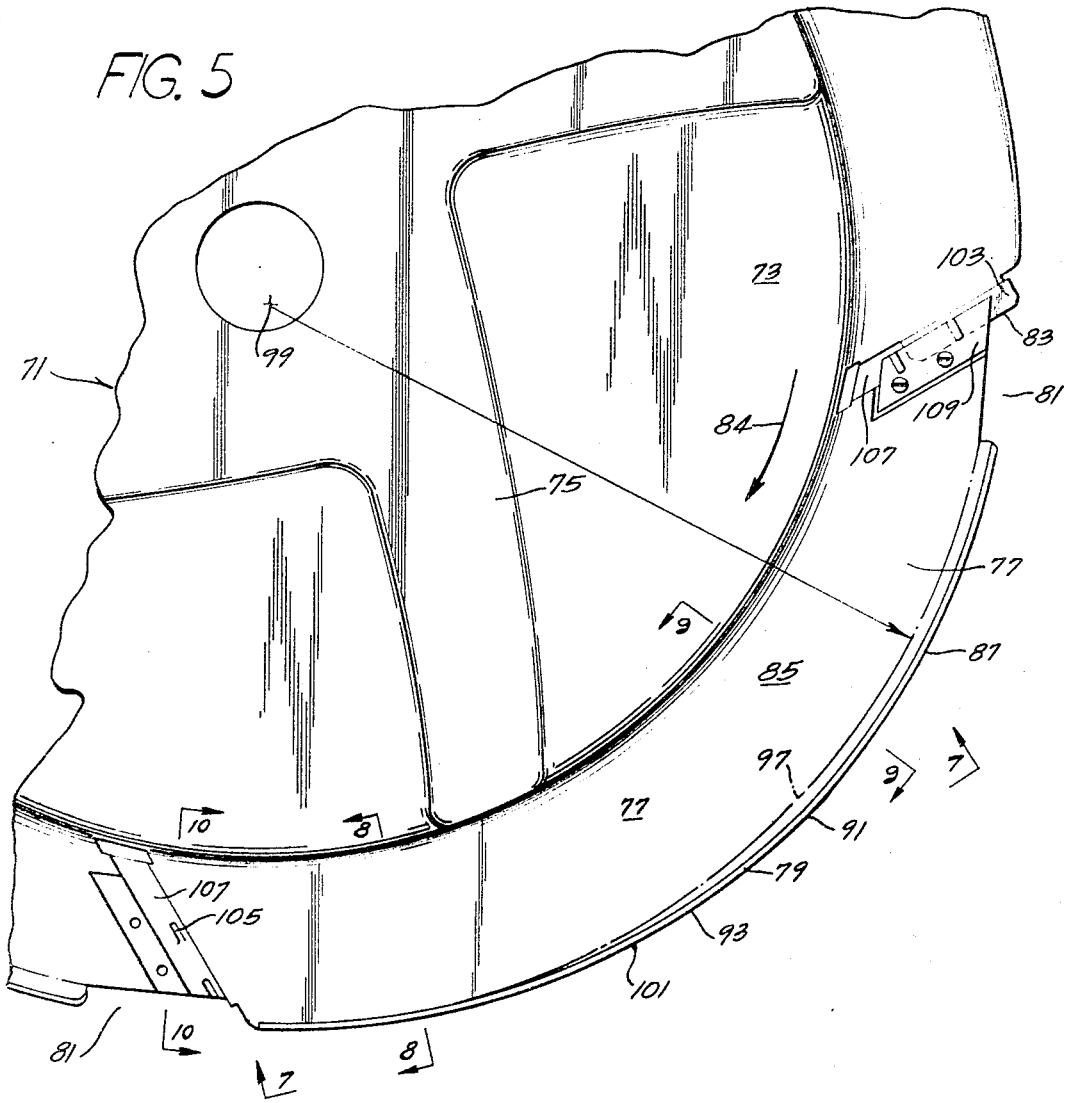
FIGURE 5 is a fragmentary view of a modified cutter embodying various of the features of the invention.
Figure 6:
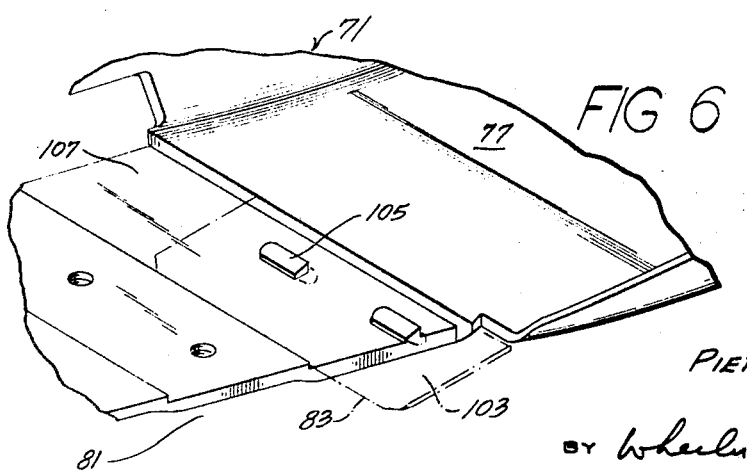
FIGURE 6 is an enlarged, fragmentary perspective view of a portion of the cutter shown in FIGURE 5.

Shown in FIGURE 1 of the drawings is a mowing device 11 which can take various forms and which is shown in the form of a lawn mower. The mowing device 11 includes a rotary blade housing 13 and a rotary blade or cutter 15 having any suitable means, such as a hole, adapted to afford connection for rotary movement. Any suitable means including bearings 17 and a shaft 19 can be employed for rotatably supporting the rotary blade or cutter 15 in the housing 13 and for rotatably driving the cutter 15. As thus far described, the arrangement is generally conventional.

In the form shown in FIGURES 1 and 2, the rotary blade or cutter 15 comprises a disk including an elevated central part 21 in a form of a frustum of a cone, together with a ring-shaped portion or part 23 extending from the lower end of the central part 21. Carried by the ring part 23 are one or more symmetrically mounted cutting knives or edges 25 which are each preceded in the direction of intended rotary movement, by an upwardly and radially outwardly extending arcuate rim 27 having a peripheral edge 29 which gradually increases in radial distance from the rotary center until the radial distance to the edge 29 from the rotary center is at least as great as the radial distance to the radially outermost end of the cutting knives 25.

In the construction specifically shown in FIGURE 1, the rim 27 has two diametrically opposed, generally identical, semi-circular portions 31 and 33 having respective centers 35 and 37 which are offset from the rotary center provided by the shaft 19.

Adjacent ends of the semi-circular rim portions 31 and 33 are radially spaced from one another. Respectively located in the spaces between the ends of the semi-circular rim portions 31 and 33 are the cutting edges 25 which preferably extend angularly with respect to a radius drawn from the rotary center. As can be seen from FIGURE 2, it is preferred to extend the cutting edges 25 to adjacent the adjacent end of the peripheral edges 29 in order to prevent the rim 27 from taking part in the cutting action. The cutting edges 25 are protected by the rim 27 in view of the gradually increasing extension of the rim from the rotary center, as viewed in the direction of intended rotation as indicated by the arrow 44, to a point at least as radially remote from the rotary center as the outer ends of the cutting edges 25. This feature prevents high velocity discharge of rocks or the like by the cutter 15 and, if desired, allows the use of cutting edges such as are provided by razor blades.

The ring part 23 of the cutter 15 can be provided with upstanding vanes 41 to create a draft drawing air through the cutter. Preferably, the vanes 41 are disposed at an angle with respect to a radial line drawn from the rotary center and are formed from the material of the disk, being bent upwardly to an angle of about 90 degrees with respect to the surface of the ring part 23. Each vane 41 is therefore adjacent to an opening 43 in the ring part 23 of the cutter.

During cutter rotation, the vanes 41 create a draft sucking air through the openings 43 from under the cutter. This air is then forced radially outwardly to the rims 27 and thence upwardly. Such action creates an area of lower pressure immediately outwardly of the rim peripheral edge, which lower pressure causes grass to be drawn in toward the rim. Such action locates the grass to be cut into the path of the cutting edges 25. The resulting grass cuttings are then drawn upwardly and are evacuated tangentially through the discharge opening in the housing. Consequently, the cutter and the housing remain relatively clean even when mowing wet grass. In addition, dispersion of the grass cuttings is improved.

Shown in FIGURES 3 and 4 is a mower 51 including a housing 53 and a cutter 55 which is generally of similar construction to the cutter 15, except that the vanes 41 are not included. In lieu of the vanes 41, the housing 53 includes a stationary vane 57 mounted at a radially outwardly and upwardly inclined disposition and in such a way as to produce increasing distance between the vane and the cutter 55 in the direction of cutter rotation. This disposition of the vane 57 with respect to the cutter 55 creates a suction, at the cutter rim 59 in the vicinity of the cutting edges 61, similar to that developed by the vanes 41 incorporated in the cutter 15.

Shown in FIGURE 5 is another cutter 71 which embodies various of the features of the invention and which can be substituted for the cutter shown in the mowers 11 and 51 illustrated in FIGURES 1 and 3. The cutter 71 comprises a disk having a generally circular central part 73 including a series of arcuately extending raised spoke portions 75 affording increased strength. Extending from then central part is a ring part 77 in the general form of a frustum of a cone. Extending from the ring part 77 is an upwardly bent rim 79 which is interrupted as shown at 81 to provide spaced rim portions. Mounted on the ring part 77 between the ends of adjacent rim portions are respective cutting knives or edges 83 which can be provided by detachably mounted razor blades.

Although the cutter 71 shown in FIGURE 5 is generally of disk form, the cutter may be considered to include a plurality of symmetrically arranged segments, one of which is indicated by the numeral 85 and all of which are generally identical. While the periphery of the cutter 71 extends continuously, the invention contemplates the use of cutter segments which are angularly separated from one another adjacent their outer peripheries.

Each cutter segment 85 is formed so that the outer periphery of the part of the rim 79 in the segment 85 includes a portion or part 87 which extends forwardly from the associated cutting edge 83, i.e., in the direction of intended cutter rotation, indicated by the numeral 84, at a gradually increasing radial distance from the center of the cutter rotation. The radial distance of the rim peripheral edge increases until such radial distance is at a maximum, indicated at 91, which maximum is at least as great as the radial distance of the radial outermost end of the associated cutting edge 83. The portion 87 of the rim periphery between the point 91 of maximum distance from the center of rotation and the cutting edge 83 provides a clearance area affording movement of grass to be cut into the path of the cutting edge 83.

Forwardly in the direction of intended rotation from the point 91 of maximum radial distance from the center of the disk, the rim 79 includes a portion or part 93 which gradually decreases in radial distance as the arcuate distance in front of the associated cutting edge 83 becomes greater. The rim periphery portion 93 comprises a camming surface to displace objects such as rocks or the like, or the hand of the operator, radially outwardly of the path of the following cutting edge 83. As a consequence, grass cutting is afforded while the throwing of rocks or the like is precluded. In addition, striking of the cutting edge 83 against objects such as rocks or the like which could dull the cutting edge 83 is prevented and the possibility of an operator cutting his hand or foot is also substantially reduced.

Various arrangements can be employed to provide a rim periphery of varying radial distance from the rotary center. In the disclosed construction, the radial distance of the rim periphery from the rotary center is determined by variation in both the height or length of the upwardly bent rim and in the angle of upward bending. Still further, in this regard, variation in the radial distance is obtained by bending the rim about an arcuately extending line 97 having a center which is eccentrically located with respect to the center of rotation.

Figure 7:
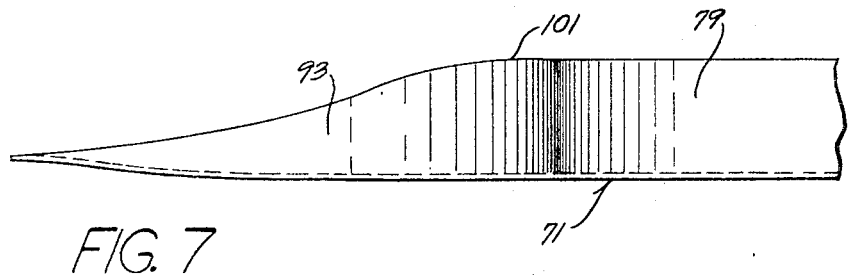
FIGURE 7 is a fragmentary side elevational view taken generally along line 7—7 of FIGURE 5.
Figure 8:
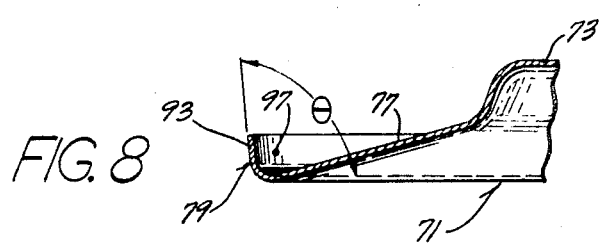
FIGURE 8 is a fragmentary sectional view taken along line 8—8 of FIGURE 5.
Figure 9:
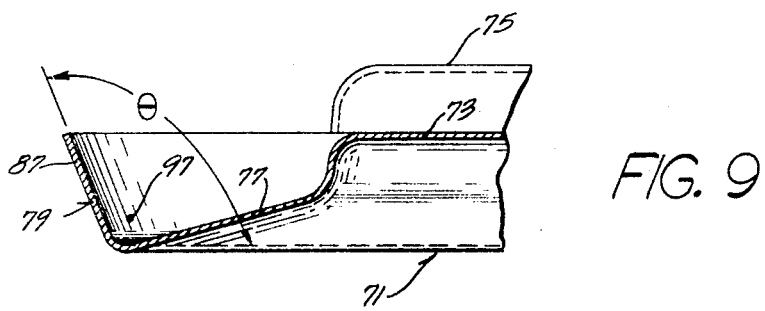
FIGURE 9 is a fragmentary sectional view taken along line 9—9 of FIGURE 5.
Figure 10:
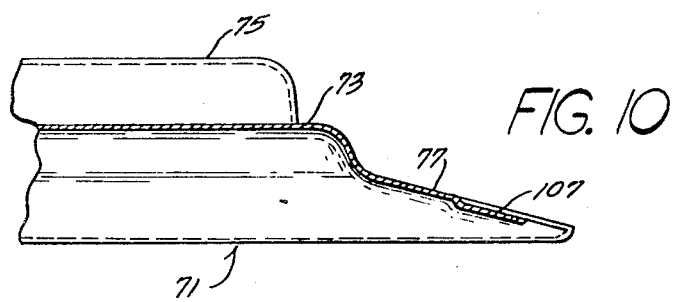
FIGURE 10 is a fragmentary sectional view taken along line 10—10 of FIGURE 5.

Thus, as can be seen from FIGURE 7, the height of the rim in the portion 93 is reduced beginning at a point 101 spaced forwardly in the direction of rotation from the point 91 of maximum radial distance from the center of rotation. In addition, as can be seen by comparing FIGURES 8 and 9, the obtuse angle $\theta$ between the rim 79 and the base plane of the ring part 77 is gradually decreased forwardly of the point 91 of maximum radial distance of the rim periphery from the rotary center.

In the rim portion 87, i.e., between the point 91 of maximum radial distance and the termination of the rim adjacent to the following cutting edge 83, the height and angular disposition of the rim are retained substantially constant. However, due to the eccentric location of the center 99 of the arcuate line 97 about which the rim is bent, the rim periphery decreases in radial distance from the point 91 toward the cutting edge 83.

Various arrangements can be employed to provide the desired cutting edges. In the preferred disclosed construction, the cutting edges 83 are provided by single-edged razor blades 103 which are positioned about locating projections 105 in slightly depressed sections 107 in the ring part 77 of the cutter 71. A blade clamp 109 is releasably fixed to the ring part 77 to retain the razor blade 103 in proper position and so as to afford razor blade replacement.

Each of the mowers and cutters disclosed herein provides a high degree of safety. At normal rotational speeds, all objects in the path of the cutting blades will be cammed away from the cutting edges by the rim peripheries. Because of the sucking action of the vanes, the grass is sucked inwardly toward the cutting edges following the eccentrically located rim periphery. The invention is in no way restricted to a lawn mower and may also be used for the cutting of reeds, rice, etc. Various arrangements and degrees of eccentric curvature can be employed in designing the rim peripheries. For instance, when only a single cutting edge is provided on a disk, the disk periphery may be designed as a polar curve of the second degree. The design can also be an Archimedes spiral. At sufficiently high rotational speeds, the vanes on the cutter or in the housing may be eliminated.

Various of the features of the invention are set forth in the following claims.

What is claimed is:

1. A rotary cutter comprising a member including means adapted for connection to afford rotary movement, a segment extending from said means adapted for connection to afford rotary movement and supporting a cutting edge extending radially of said means adapted for connection to afford rotary movement, said segment having an arcuate peripheral edge extending in the direction of intended rotary movement from a first point located at a first radial distance from said means adapted for connection to afford rotary movement to a second point located at a greater maximum radial distance from said means adapted for connection to afford rotary movement, characterized in that said arcuate peripheral edge of said segment, in the direction of intended rotation and from said point of maximum radial distance, decreases in radial distance from said means adapted for connection to afford rotary movement, and in that said cutting edge is carried adjacent said first point and terminates at a distance from said means adapted for connection to afford rotary movement no greater than said maximum radial distance.

2. A rotary cutter according to claim 1 wherein said member comprises a disc including a ring portion characterized in that said disc also includes an upwardly projecting rim extending along the outer periphery of the ring portion to form said peripheral edge and in that said cutting edge is carried on said ring portion.

3. A rotary cutter according to claim 2 characterized in that said ring portion includes an upstanding vane.

4. A rotary cutter in acordance with claim 2 characterized in that said ring portion includes a vane bent upwardly from said ring portion, whereby said ring portion is apertured adjacent to said vane.

5. A rotary cutter according to claim 1 characterized in that said cutting edge is provided by the cutting edge of a detachably connected razor blade.

6. A rotary cutter according to claim 1 characterized in that said cutter is rotatably mounted in a lawn mower housing including a radially extending vane located above said cutter.

7. A rotary cutter comprising a member including means adapted for connection to afford rotary movement, a cutting edge, and a segment extending from said means adapted for connection to afford rotary movement and supporting said cutting edge in radially extending relation with respect to said means adapted for connection to afford rotary movement, said segment having an arcute peripheral margin extending in the direction of intended rotary movement from adjacent to said cutting edge and increasing in radial distance from said means adapted for connection to afford rotary movement to a point of maximum radial distance from said means adapted for connection to afford rotary movement, said point of maximum radial distance being at a greater radial distance from said means adapted for connection to afford rotary movement than the radially outermost end of said cutting edge.

8. A rotary cutter according to claim 7 wherein said member comprises a disc including a ring portion characterized in that said disc also includes an upwardly projecting rim extending along the outer periphery of the ring portion to form said peripheral edge and in that said cutting edge is carried on said ring portion.

9. A rotary cutter in accordance with claim 8 characterized in that said ring portion includes an upstanding vane.

10. A rotary cutter in accordance with claim 8 characterized in that said ring portion includes a vane bent upwardly from said ring portion, whereby said ring portion is apertured adjacent to said vane.

11. A rotary cutter according to claim 7 characterized in that said cutting edge is provided by the cutting edge of a detachably connected razor blade.

12. A rotary cutter according to claim 7 characterized in that said cutter is rotatably mounted in a lawn mower housing including a radially extending vane located above said cutter.

13. A rotary cutter comprising a member including means adapted for connection to afford rotary movement, a cutting edge, and a segment extending from said means adapted for connection to afford rotary movement and supporting said cutting edge in radially extending relation with respect to said means adapted for connection to afford rotary movement, said segment having an arcuate peripheral margin extending in the direction of intended rotation from adjacent to said cutting edge and increasing in radial distance from said means adapted for connection to afford rotary movement to a point of maximum radial distance from said means adapted for connection to afford rotary movement and then decreasing in radial distance from said means adapted for connection to afford rotary movement, said point of maximum radial distance being at a greater radial distance from said means adapted for connection to afford rotary movement than the radially outermost end of said cutting edge.

14. A rotary cutter according to claim 13 wherein said member comprises a disc including a ring portion characterized in that said disc also includes an upwardly projecting rim extending along the outer periphery of the ring portion to form said peripheral edge and in that said cutting edge is carried on said ring portion.

15. A rotary cutter according to claim 14 characterized in that said ring portion includes an upstanding vane.

16. A rotary cutter in accordance with claim 14 characterized in that said ring portion includes a vane bent upwardly from said ring portion, whereby said ring portion is apertured adjacent to said vane.

17. A rotary cutter according to claim 13 characterized in that said cutting edge is provided by the cutting edge of a detachably connected razor blade.

18. A rotary cutter according to claim 13 characterized in that said cutter is rotatably mounted in a lawn mower housing including a radially extending vane located above said cutter.

References Cited
UNITED STATES PATENTS

| | | | |
|---|---|---|---|
| 1,680,824 | 8/1928 | Thompson | 56—295 |
| 2,859,581 | 11/1958 | Kroll et al. | 56—295 |
| 2,920,436 | 1/1960 | Benson | 56—295 |
| 2,932,147 | 4/1960 | Beeston | 56—295 |
| 3,103,094 | 9/1963 | Cook | 56—295 |
| 3,178,872 | 4/1965 | Swindler | 56—25.4 |
| 3,183,655 | 5/1965 | Dunlap et al. | 56—295 |
| 3,338,039 | 8/1967 | Nightingale et al. | 56—295 |

ANTONIO F. GUIDA, Primary Examiner

PASQUALE A. RAZZANO, Assistant Examiner